United States Patent
Otoguro et al.

(10) Patent No.: US 10,298,797 B2
(45) Date of Patent: *May 21, 2019

(54) OPTICAL SCANNING APPARATUS AND IMAGE FORMING APPARATUS

(71) Applicant: CANON KABUSHIKI KAISHA, Tokyo (JP)

(72) Inventors: Yasuaki Otoguro, Abiko (JP); Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,245

(22) Filed: May 23, 2017

(65) Prior Publication Data

US 2017/0257507 A1    Sep. 7, 2017

Related U.S. Application Data

(63) Continuation of application No. 14/916,159, filed as application No. PCT/JP2014/073033 on Sep. 2, 2014, now Pat. No. 9,692,926.

(30) Foreign Application Priority Data

Sep. 6, 2013    (JP) .................................. 2013-185206

(51) Int. Cl.
*G02B 7/00*    (2006.01)
*G02B 26/12*    (2006.01)
(Continued)

(52) U.S. Cl.
CPC ........... *H04N 1/00909* (2013.01); *G02B 7/00* (2013.01); *G02B 27/0006* (2013.01);
(Continued)

(58) Field of Classification Search
CPC combination set(s) only.
See application file for complete search history.

(56) References Cited

U.S. PATENT DOCUMENTS 5,245,481 A * 9/1993 Kaneko ................... B41J 2/471
347/257
5,313,289 A * 5/1994 Nagane ............ G03G 15/04036
358/475
(Continued)

FOREIGN PATENT DOCUMENTS

CN    101526670 A    9/2009
JP    H06-021014 U    3/1994
(Continued)

*Primary Examiner* — Matthew Luu
*Assistant Examiner* — Lily K Kemathe
(74) *Attorney, Agent, or Firm* — Canon U.S.A., Inc. I.P. Division

(57) ABSTRACT

Sealability between a cover member and a transparent member of an optical scanning apparatus is improved to improve dustproof performance. An optical scanning apparatus includes an elastic member 75 for sealing a portion between a cover member 70 and a glass member 90, the elastic member 75 being formed on the cover member 70 so as to surround an opening portion 42, the elastic member 75 being formed from a material that differs from that of the cover member 70. The elastic member 75 has a protrusion 75a that extends towards the glass member 90. The protrusion 75a fills a gap between the cover member 70 and the glass member 90 by contacting the glass member 90 and being elastically deformed.

7 Claims, 6 Drawing Sheets

(51) Int. Cl.
  *G03G 15/04* (2006.01)
  *G02B 27/00* (2006.01)
  *H04N 1/00* (2006.01)
  *H04N 1/113* (2006.01)

(52) U.S. Cl.
  CPC ... *G03G 15/04036* (2013.01); *H04N 1/00551* (2013.01); *H04N 1/113* (2013.01); *G02B 26/12* (2013.01); *H04N 2201/0094* (2013.01)

(56) References Cited

U.S. PATENT DOCUMENTS

| | | | | |
|---|---|---|---|---|
| 5,489,995 A * | 2/1996 | Iso | ............ | H04N 1/00909 358/483 |
| 5,592,337 A * | 1/1997 | Hama | ............ | G02B 7/182 359/216.1 |
| 5,673,136 A * | 9/1997 | Inoue | ............ | G02B 7/008 359/205.1 |
| 5,877,883 A * | 3/1999 | Inoue | ............ | G02B 26/12 359/196.1 |
| 8,542,263 B2 * | 9/2013 | Yamashita | ............ | B41J 2/473 347/242 |
| 9,207,452 B2 * | 12/2015 | Aoki | ............ | G02B 26/10 |
| 9,692,926 B2 * | 6/2017 | Otoguro | ............ | G02B 7/00 |
| 2002/0018306 A1 | 2/2002 | Andoh | ............ | G02B 7/025 359/819 |
| 2002/0149363 A1 * | 10/2002 | Ikegame | ............ | G02B 7/1821 324/244.1 |
| 2003/0016447 A1 * | 1/2003 | Kato | ............ | G02B 5/1814 359/569 |
| 2004/0085605 A1 * | 5/2004 | Yoshizawa | ............ | G02B 7/181 359/216.1 |
| 2005/0129353 A1 * | 6/2005 | Torashima | ............ | G02B 1/11 385/18 |
| 2007/0024943 A1 * | 2/2007 | Namba | ............ | G03G 15/04072 359/216.1 |
| 2007/0165099 A1 * | 7/2007 | Yoshizawa | ....... | G03G 15/04036 347/245 |
| 2007/0279609 A1 * | 12/2007 | Oshida | ............ | G02B 5/045 355/53 |
| 2007/0285551 A1 * | 12/2007 | Noto | ............ | G02B 27/0006 348/335 |
| 2008/0018956 A1 * | 1/2008 | Inoue | ............ | H04N 1/00519 358/474 |
| 2008/0079846 A1 * | 4/2008 | Ikari | ............ | G02B 27/0006 348/373 |
| 2008/0118287 A1 * | 5/2008 | Masaki | ............ | G03G 21/00 399/350 |
| 2010/0033787 A1 * | 2/2010 | Serizawa | ......... | G03G 15/04036 359/197.1 |
| 2010/0091083 A1 * | 4/2010 | Itami | ............ | B41J 2/471 347/261 |
| 2010/0212825 A1 * | 8/2010 | Hasegawa | ............ | G02B 7/00 156/275.5 |
| 2012/0099873 A1 * | 4/2012 | Ninomiya | ........ | G03G 15/04036 399/15 |
| 2012/0099874 A1 * | 4/2012 | Nakaie | ............ | G03G 15/04036 399/16 |
| 2013/0002789 A1 * | 1/2013 | Katayama | ............ | G02B 26/12 347/224 |
| 2013/0155478 A1 * | 6/2013 | Aoki | ............ | G02B 26/10 359/197.1 |
| 2013/0222918 A1 * | 8/2013 | Nemoto | ........... | G03G 15/04054 359/622 |
| 2013/0342628 A1 * | 12/2013 | Iwai | ............ | G02B 26/12 347/224 |
| 2013/0342906 A1 * | 12/2013 | Dahmen | ............ | G02B 27/0006 359/513 |
| 2014/0376089 A1 * | 12/2014 | Haberer | ............ | G02B 27/0006 359/511 |
| 2015/0179856 A1 * | 6/2015 | Abe | ............ | G02B 3/08 136/259 |
| 2016/0219177 A1 * | 7/2016 | Otoguro | ............ | G02B 7/00 |
| 2016/0219178 A1 * | 7/2016 | Momoka | ............ | G02B 26/12 |
| 2017/0257507 A1 * | 9/2017 | Otoguro | ............ | G02B 7/00 |
| 2017/0276932 A1 * | 9/2017 | Iwata | ............ | H01L 23/02 |
| 2017/0357145 A1 * | 12/2017 | Matsumura | ............ | G03B 17/08 |
| 2018/0003957 A1 * | 1/2018 | Matsumaru | ............ | G02B 27/0006 |
| 2018/0231769 A1 * | 8/2018 | Aruga | ............ | G02B 26/124 |

FOREIGN PATENT DOCUMENTS

| | | |
|---|---|---|
| JP | 2001-100134 A | 4/2001 |
| JP | 2009-237552 A | 10/2009 |
| JP | 2013-156350 A | 8/2013 |

* cited by examiner (a)

(b)

(i)      (ii)

OPTICAL SCANNING APPARATUS AND IMAGE FORMING APPARATUS

CROSS-REFERENCE TO RELATED APPLICATION

This application is a continuation, and claims the benefit, of U.S. application Ser. No. 14/916,159 filed Mar. 2, 2016, which is a national phase application of International Patent Application No. PCT/JP2014/073033, filed on Sep. 2, 2014, which patent(s) and patent applications are hereby incorporated by reference herein in their entireties, and this application claims the benefit of, and priority to, Japanese Patent Application No. 2013-185206 filed Sep. 6, 2013, which application is hereby incorporated by reference herein in its entirety.

TECHNICAL FIELD

The present invention relates to dustproof measures in a housing of an optical scanning apparatus that is used in an image forming apparatus, such as a copying machine, a printer, a facsimile machine, or a multifunction apparatus thereof.

BACKGROUND ART

As an optical scanning apparatus that is used in an electrophotographic image forming apparatus, an optical scanning apparatus having the following structure is well known. That is, in the optical scanning apparatus, a light beam that is emitted from a light source is deflected by a rotary polygon mirror, and the deflected light beam is guided to a photosensitive surface of a photoconductor by an optical component, such as a lens and a mirror, to form a latent image on the photoconductor. FIG. 6 is a schematic view of the structural components of an optical scanning apparatus that has hitherto been generally used. Such an optical scanning apparatus is described in detail in the description of embodiments below. In the optical scanning apparatus, when dirt, such as dust, adheres to the optical components in the interior of the optical scanning apparatus, the light beam is blocked by the adhered dust, as a result of which the light quantity of light beam on the photoconductor surface is reduced, thereby causing changes in density to occur. In recent years, as a result of air pollution, the amount of chemical substances and the amount of fine dust in the atmosphere having a size that is less than or equal to 1 µm are increasing. Therefore, a reduction in image quality caused by the dirt on the optical component is becoming a more serious problem than before.

In order to prevent the entry of, for example, dust into an optical scanning apparatus from the outside, for example, the method for sealing a gap at an outer peripheral portion of the optical scanning apparatus by putting a foaming member in the gap, or the method for placing a tape over the gap is often carried out. However, due to, for example, the reasons described below, it is necessary to further improve sealability. In order to meet the recent demand for increasing image forming speed, the rotation speed of the rotary polygon mirror needs to be higher than those of existing products. The rotary polygon mirror that is set in the optical scanning apparatus generates air current by rotating at a high speed. Wind flows in fine spaces that connect the insides of continuously connected air bubbles or places where foaming materials are affixed. At a certain location, air flows from the inside to the outside, and, at another location, air flows from the outside to the inside. The air that flows from the outside to the inside contains fine dust that contaminates the optical component. Therefore, the more the device is operated, the greater the amount of fine dust that enters the inside of the optical scanning apparatus. Consequently, the dust adheres to the surface of the optical component and the inside of a housing. In particular, dust contained in the air current around the rotary polygon mirror adheres to a reflecting surface of the rotary polygon mirror that has rotated at a high speed. That is, the rotation of the rotary polygon mirror causes a Karman vortex and air turbulence to be generated in the vicinity of the reflecting surface of the rotary polygon mirror, as a result of which the air current carrying the dust collides violently with the reflecting surface. As a result, the fine dust that collides with the reflecting surface of the rotary polygon mirror accumulates, and portions of the reflecting surface with which the air current frequently collides become dirty first. Therefore, the reflectivity at the dirty portions of the reflecting surface is reduced. In addition, such a reduction in the reflectivity caused by the dirt reduces the light quantity of light beam that is guided to the photoconductors, as a result of which the density of output images is reduced.

In the optical scanning apparatus, in order to guide the light beam deflected in the optical scanning apparatus to the photoconductor, an opening portion for sending out the light beam from the inside of the optical scanning apparatus to the outside of the optical scanning apparatus is needed. Therefore, the optical scanning apparatus always has the opening portion for allowing the light beam to exit to the outside of the optical scanning apparatus. At the opening portion, in order to prevent contamination such as that described above, primarily, a glass member is attached to the opening portion with a double-sided tape. For example, Patent Literature 1 proposes a structure for bonding and securing part of the glass member to a housing.

CITATION LIST

Patent Literature

PTL 1: Japanese Patent Laid-Open No. 05-080268

SUMMARY OF INVENTION

Technical Problem

However, the structure that uses the double-sided tape as in Patent Literature 1 has the following problem. That is, since a dustproof glass member and a cover member are bonded and secured to each other with a thin member, such as the double-sided tape, when warping or the like of the cover member occurs, a location where the tape and the cover member cannot contact each other or a location where the tape and the glass member cannot contact each other exists, that is, a gap is formed. In addition, since the cover member has a large opening portion for emission, it is difficult to increase its rigidity as in the case of the housing. Therefore, temporal deformation during, for example, transport, causes, for example, peeling of the double-sided tape. In the bonding method that is described in Patent Literature 1, since the glass is secured with an adhesive having a hardness of 60 or greater, the difference between the linear expansion of the glass and the linear expansion of the housing, a resin material being primarily used therefor, may cause distortion to occur when the temperature changes. Further, since the adhesive is not applied to the entire portion where the housing and the glass contact each other, not only is it difficult to completely eliminate the gap, but also the surface of the glass member through which a light beam passes may become dirty due to, for example, stringiness when the adhesive is applied to the glass member.

The present invention is achieved based on such a situation. It is an object of the present invention to make it possible to improve sealability between a cover member and a transparent member of an optical scanning apparatus to improve dustproof performance.

Solution to Problem

To solve the above-described problems, the present invention has the following structure.

(1) An optical scanning apparatus comprises a light source that emits a light beam; a rotary polygon mirror that deflects the light beam emitted from the light source such that a photoconductor is scanned with the light beam; an optical member that guides the light beam deflected by the rotary polygon mirror to the photoconductor; a housing that accommodates the rotary polygon mirror and the optical member therein; a cover member that has an opening portion for allowing the light beam to exit to an outside from an inside of the housing; and a transparent member that is mounted on the cover member to cover the opening portion, wherein the optical scanning apparatus includes an elastic member for sealing a portion between the cover member and the transparent member, the elastic member being molded on the cover member so as to surround the opening portion, the elastic member being molded from a material that differs from that of the cover member, wherein the elastic member has a protrusion that extends towards the transparent member, and wherein the protrusion fills a gap between the cover member and the transparent member by contacting the transparent member and being elastically deformed.

(2) An image forming apparatus comprises a photoconductor; the optical scanning apparatus according to (1) that irradiates the photoconductor with the light beam and forms an electrostatic latent image; developing means for developing the electrostatic latent image formed by the optical scanning apparatus and forming a toner image; and transferring means for transferring the toner image formed by the developing means to a recording medium.

Advantageous Effects of Invention

According to the present invention, it is possible to improve sealability between the cover member and the transparent member of the optical scanning apparatus to improve dustproof performance.

DESCRIPTION OF EMBODIMENTS

Forms for carrying out the present invention are hereunder described in more detail by way of embodiments. First, the structure of an existing optical scanning apparatus is described. Then, the embodiments are described.

[Structure of Existing Optical Scanning Apparatus]

Figure 6:
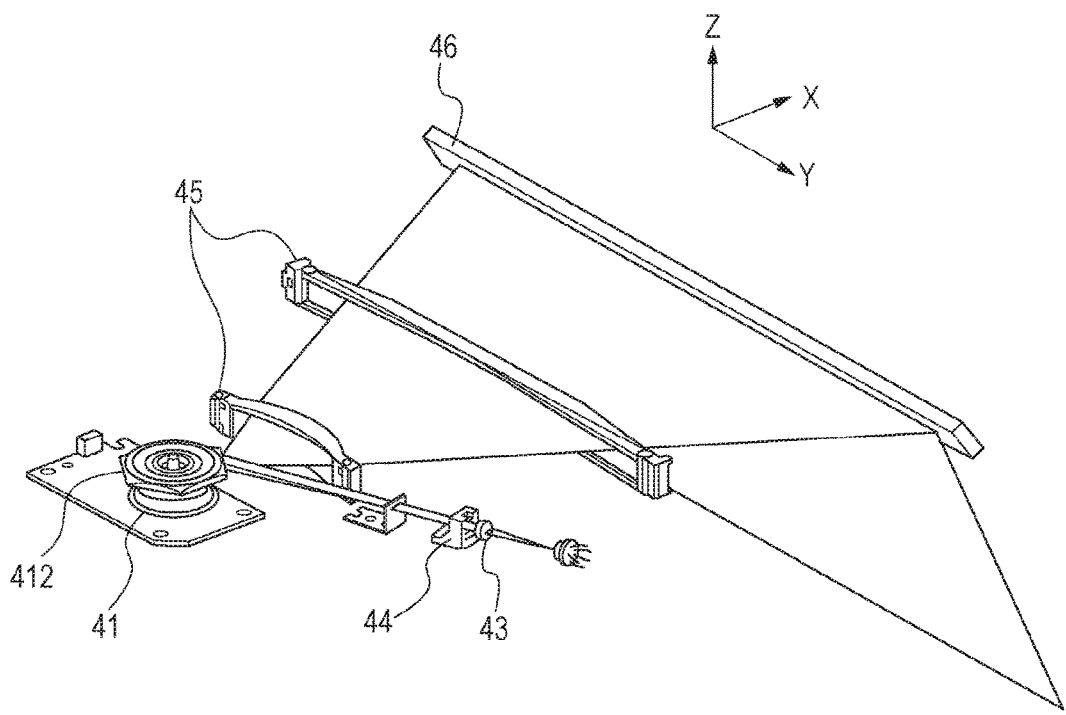
FIG. 6 is a schematic structural view showing the structure of an existing optical scanning apparatus.

FIG. 6 schematically shows structural components of an existing optical scanning apparatus. The optical scanning apparatus that forms electrostatic latent images by applying a light beam to photoconductor includes a rotary polygon mirror 412, which is a deflector, a motor unit 41 that rotates the rotary polygon mirror 412, and optical members. The optical members include a collimator lens 43 and a cylindrical lens 44 that shape a light beam incident upon the motor unit 41. The optical members also include one or more fθ lenses (hereunder referred to as "optical lenses") 45 for causing the light-beam scanning speed at each photoconductor to be uniform and a reflecting mirror 46 that guides the light beam to the photoconductor. At the motor unit 41, the rotary polygon mirror 412 having multiple reflecting mirror surfaces at its outer periphery is rotated at a high speed to cause the incident light beam to be deflected such that each photoconductor is scanned with the light beam.

The light quantity of the light beam that is guided to luminous bodies is closely related to image density. Unintended changes in the light quantity causes the density of an image formed on a recording sheet (recording medium) to be "low" or "high". In particular, when dirt, such as dust, adheres to the optical components in the optical scanning apparatus, the adhered dust blocks the light beam. Therefore, the light quantity of the light beam that is guided to the photoconductor is reduced, as a result of which the density is reduced. As described above, a reduction in image quality caused by contamination of the optical components by fine dust having a size less than or equal to 1 μm is becoming a problem. Ordinarily, the optical components, which are structural components of the optical scanning apparatus, are accommodated in a housing for protecting the optical components from substances that contaminate such optical components. In the description below, the direction of a rotation axis of a rotary polygon mirror 412 at a motor unit 41 is a Z axis direction; a main scanning direction, which is a light-beam scanning direction, or a longitudinal direction of a reflecting mirror 46 is a Y axis direction; and a direction that is perpendicular to the Y axis and the Z axis is an X axis direction.

First Embodiment

[Image Forming Apparatus]

Figure 1:
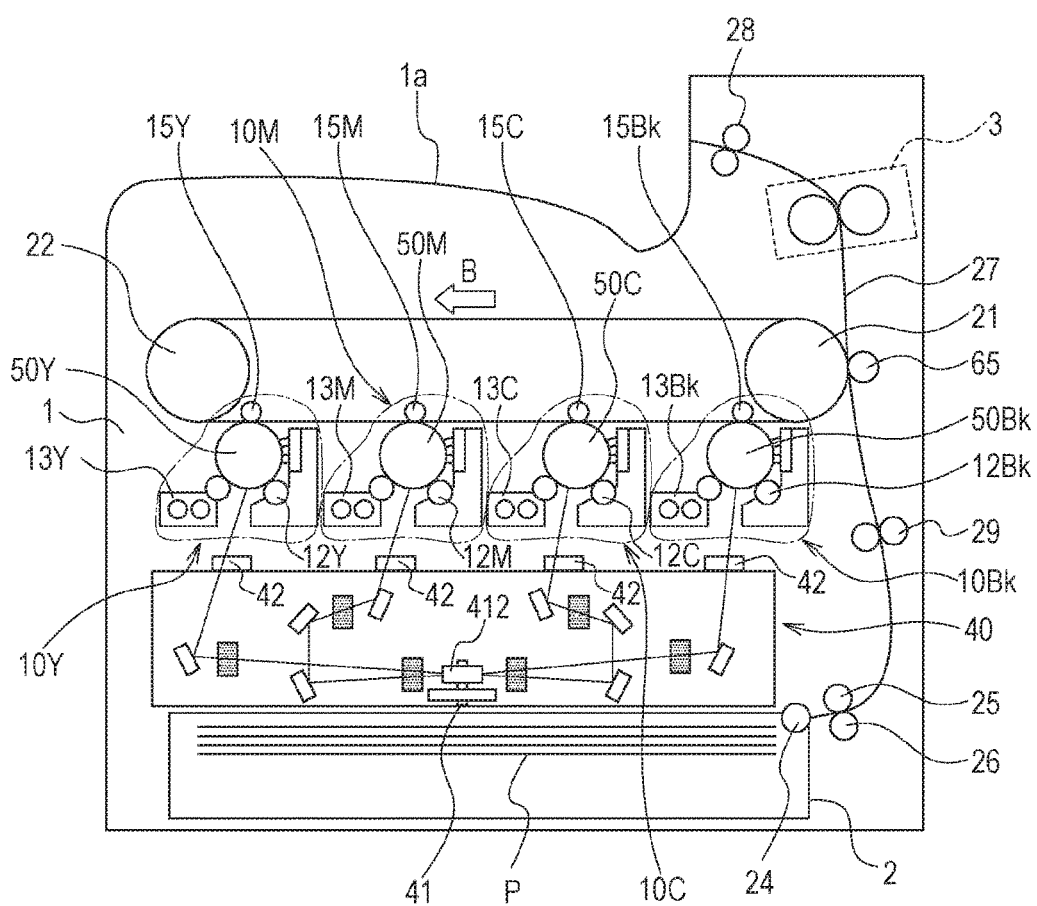
FIG. 1 is a schematic structural view for giving a general description of image forming apparatuses according to first to third embodiments.

The structure of an image forming apparatus according to a first embodiment is described. FIG. 1 is a schematic structural view of the entire structure of a tandem color laser beam printer according to the embodiment. The laser beam printer (hereunder simply referred to as the "printer") includes four image forming engines 10Y, 10M, 10C, and 10Bk (illustrated by alternate long and short dashed lines) for forming toner images of corresponding colors, yellow (Y), magenta (M), cyan (C), and black (Bk). The printer includes an intermediate transfer belt 20 to which the toner images are transferred from the image forming engines 10Y, 10M, 10C, and 10Bk. In addition, the printer is formed so as to form a full-color image by transferring the toner images superimposed upon and transferred to the intermediate transfer belt 20 to a recording sheet P, which is a recording medium. The symbols Y, M, C, and Bk that denote the corresponding colors are hereunder omitted unless these symbols need to be used.

The intermediate transfer belt 20 is an endless belt, and is wound around a pair of belt transport rollers 21 and 22. The intermediate transfer belt 20 is formed such that the toner images formed at the image forming engines 10 for the corresponding colors are transferred to the intermediate transfer belt 20 while the intermediate transfer belt 20 rotates in the direction of arrow B. A second transfer roller 65 is disposed at a location where the second transfer roller 65 opposes the belt transport roller 21 with the intermediate transfer belt 20 being interposed therebetween. The recording sheet P is inserted between the second transfer roller 65 and the intermediate transfer belt 20 that press-contact each other, so that the toner images are transferred from the intermediate transfer belt 20. The above-described four image forming engines 10Y, 10M, 10C, and 10Bk are disposed side by side below the intermediate transfer belt 20, so that the toner images formed in accordance with pieces of image information concerning the corresponding colors are transferred to the intermediate transfer belt 20 (hereunder referred to as "first transfer"). These four image forming engines 10 are such that the image forming engine 10Y for yellow, the image forming engine 10M for magenta, the image forming engine 10C for cyan, and the image forming engine 10Bk for black are disposed in that order along the rotation direction of the intermediate transfer belt 20 (the direction of arrow B).

An optical scanning apparatus 40 that exposes photoconductor drums 50, which are photoconductors, of the corresponding image forming engines 10 in accordance with pieces of image information is disposed below the image forming engines 10. The optical scanning apparatus 40 is an optical scanning apparatus that is common to all of the image forming engines 10Y, 10M, 10C, and 10Bk, and includes four semiconductor lasers (not shown) that emit laser beams modulated in accordance with pieces of image information concerning the corresponding colors. The optical scanning apparatus 40 includes the rotary polygon mirror 412 that deflects the light beams such that each photoconductor drum 50 is scanned with the corresponding light beam along the axis direction of the photoconductor drum 50 (the Y axis direction), and the motor unit 41 that rotates the rotary polygon mirror 412. Each light beam deflected by the rotary polygon mirror 412 is guided to the optical members in the optical scanning apparatus 40, exits from each opening portion 42 to the outside of the optical scanning apparatus 40, and is guided to each photoconductor drum 50, so that each photoconductor drum 50 is exposed to the corresponding light beam.

Each image forming engine 10 includes the photoconductor drum 50 and a charging roller 12 that charges the photoconductor drum 50 to a uniform background potential. In addition, each image forming engine 10 includes a developing unit 13 that forms a toner image by developing an electrostatic latent image formed on the corresponding photoconductor drum 50 by exposing the corresponding photoconductor drum 50 to the light beam. The developing units 13 form the toner images in accordance with the pieces of image information concerning the corresponding colors on the corresponding photoconductor drums 50. First transfer rollers 15 are disposed at locations opposing the photoconductor drums 50 of the corresponding image forming engines 10 such that the intermediate transfer belt 20 is interposed between the first transfer rollers 15 and the corresponding photoconductor drums 50. By applying predetermined transfer voltage to the first transfer rollers 15, the first transfer rollers 15 transfer the toner images on the corresponding photoconductor drums 50 to the intermediate transfer belt 20.

The recording sheet P is supplied into the printer from a sheet-feeding cassette 2 that is accommodated at a lower portion of a printer housing 1, more specifically, to a second transfer position where the intermediate transfer belt 20 and the second transfer roller 65 contact each other. A sheet-feeding roller 25 and a pickup roller 24 for taking out recording sheets P accommodated in the sheet-feeding cassette 2 are provided side by side with each other above the sheet-feeding cassette 2. A retard roller 26 that prevents double feeding of the recording sheets P is disposed at a location where the retard roller 26 opposes the sheet-feeding roller 25. A transport path 27 for transporting the recording sheets P in the printer is substantially perpendicularly provided along a right side face of the printer housing 1. The recording sheet P that has been taken out from the sheet-feeding cassette 2 that is positioned at a bottom portion of the printer housing 1 moves upward in the transport path 27, and is sent to registration rollers 29 that control the timing in which the recording sheet P moves to the second transfer position. Thereafter, after the toner images have been transferred to the recording sheet P at the second transfer position, the recording sheet P is sent to a fixing unit 3 (illustrated by a broken line) that is provided at a downstream side in a transport direction. Then, the recording sheet P to which the toner images have been fixed by the fixing unit 3 passes between discharging rollers 28, and is discharged to a sheet-discharging tray 1a provided at an upper portion of the printer housing 1.

In order to form a full-color image by the color laser beam printer having such a structure, first, the optical scanning apparatus 40 exposes the photoconductor drums 50 of the corresponding image forming engines 10 at a predetermined timing in accordance with the pieces of image information concerning the corresponding colors. This causes the latent images that are in accordance with the pieces of image information to be formed on the photoconductor drums 50 of the corresponding image forming engines 10. Here, in order to obtain good image quality, it is necessary for the latent images that are formed by the optical scanning apparatus 40 to be reproduced precisely at predetermined locations on the corresponding photoconductor drums 50, and the light quantity of the light beams for forming the latent images to always consistently be desired values.

[Structure of Optical Scanning Apparatus]

Figure 2:
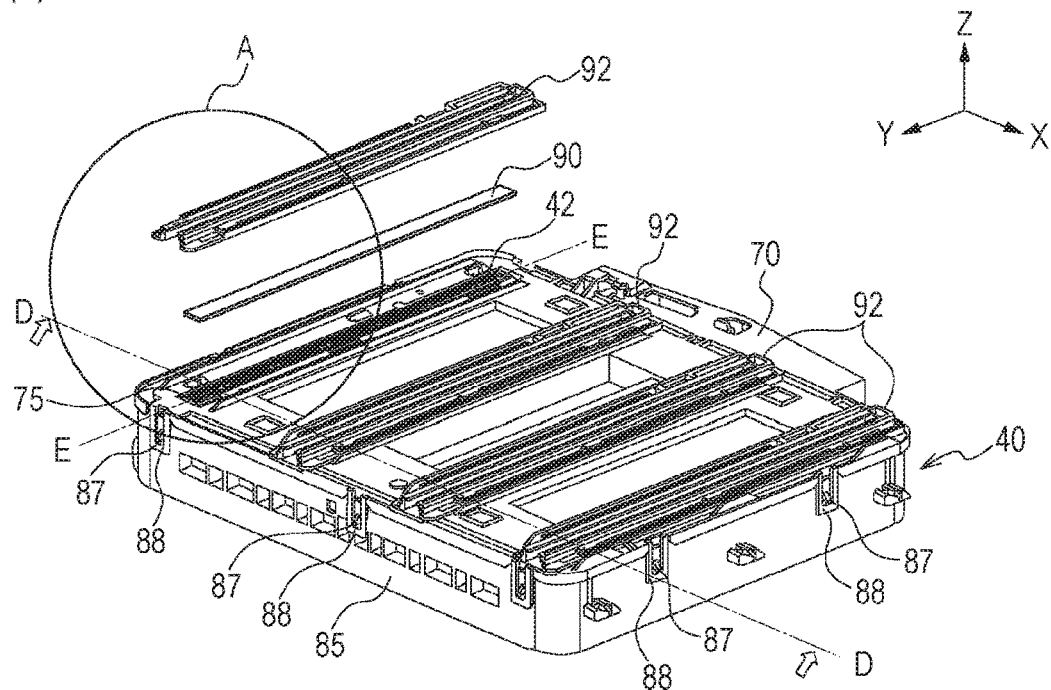
FIG. 2 is a schematic structural view and an enlarged perspective view of an entire optical scanning apparatus according to the first embodiment.
Figure 2:
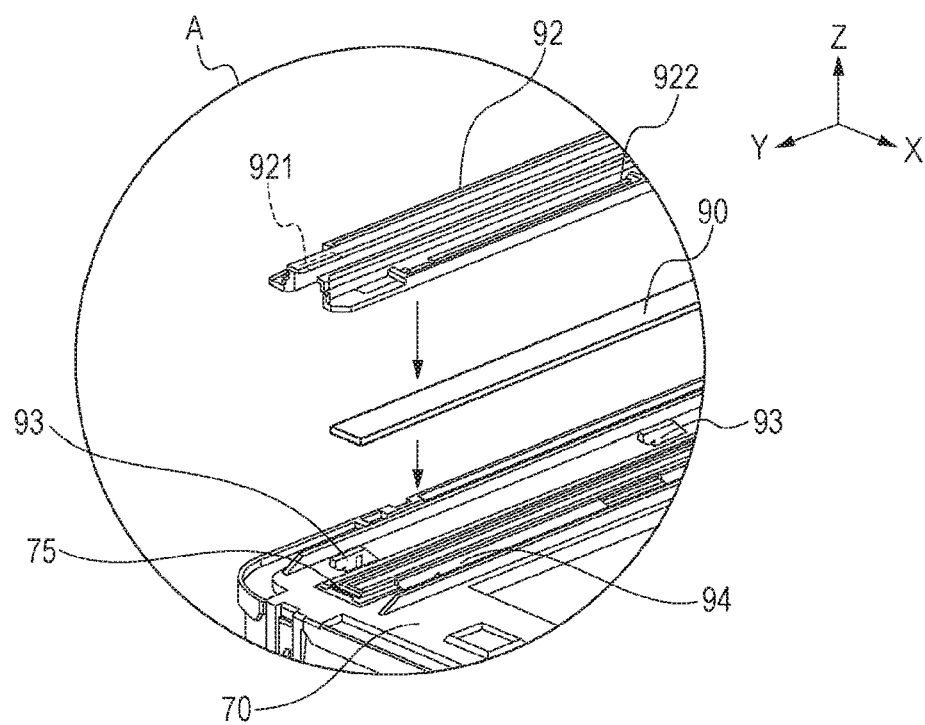

FIG. 2(a) is a schematic structural perspective view of the structure of the optical scanning apparatus according to the embodiment. FIG. 2(b) is an enlarged perspective view of a circled portion A in FIG. 2(a). A light source unit, a deflector (see FIG. 6), optical lenses 45, and the reflecting mirror 46 are disposed in the interior or at an outer peripheral portion of the optical scanning apparatus 40. A light source that emits a light beam is mounted on the light source unit. The deflector (the rotary polygon mirror 412 and the motor unit 41) (see FIG. 6) reflects/deflects the light beam. The optical lenses 45 and the reflecting mirror 46 (see FIG. 6) are optical members required for guiding the light beam to a surface to be scanned and forming images. Each elastic member 75 (dark portion that is black in the figure) is integrally formed with a cover member 70. The cover member 70 is set on a top portion of a housing 85, for example, by a snap-fit method or by a securing method using screws. In the embodiment, the cover member 70 is secured to the housing 85 by engaging snap-fit portions 88 with snap-fit engagement portions 87.

Each elastic member 75 is formed as follows. That is, after the cover member 70 has been molded, the cover member 70 is reset in a different mold, to perform, for example, insert molding or outsert molding for additionally molding each elastic member 75. Each elastic member 75 has low heat capacity, and tends to be cooled and hardened. Therefore, by pouring the material of each elastic member 75 that has been melted at around 100° C. into the mold by the insert molding or the outsert molding, it is possible to integrally form each elastic member 75 and the cover member 70 with each other without deforming by heat the cover member 70 that has been previously molded. Even in the embodiment, the material of each elastic member 75 that has been melted at 120° C. is poured with respect to the cover member 70 formed from ABS resin. Immediately after each elastic member 75 has come into contact with the cover member 70, each elastic member 75 is suddenly cooled and hardened, as a result of which it is possible to integrate each elastic member 75 with the cover member 70 without deforming the cover member 70. In this way, by molding each elastic member 75 by using the mold, advantages such as those mentioned below can be provided. That is, each glass member 90, which is a dustproof transparent member, is placed on the cover member 70 with each elastic member 75 being interposed therebetween so as to cover light-beam exiting opening portions 42 (hereunder referred to as the "opening portions 42"). Each elastic member 75 may be formed by two-color molding in which each elastic member 75 and the cover member 70 formed from a different material are integrally molded with each other. In addition, although, in the embodiment, the transparent members that cover the light-beam opening portions 42 are described as being the glass members 90, the transparent members are not limited thereto. In other words, the members that cover the light-beam opening portions 42 only need to be transparent members, so that they may be made of, for example, plastic.

Figure 3:
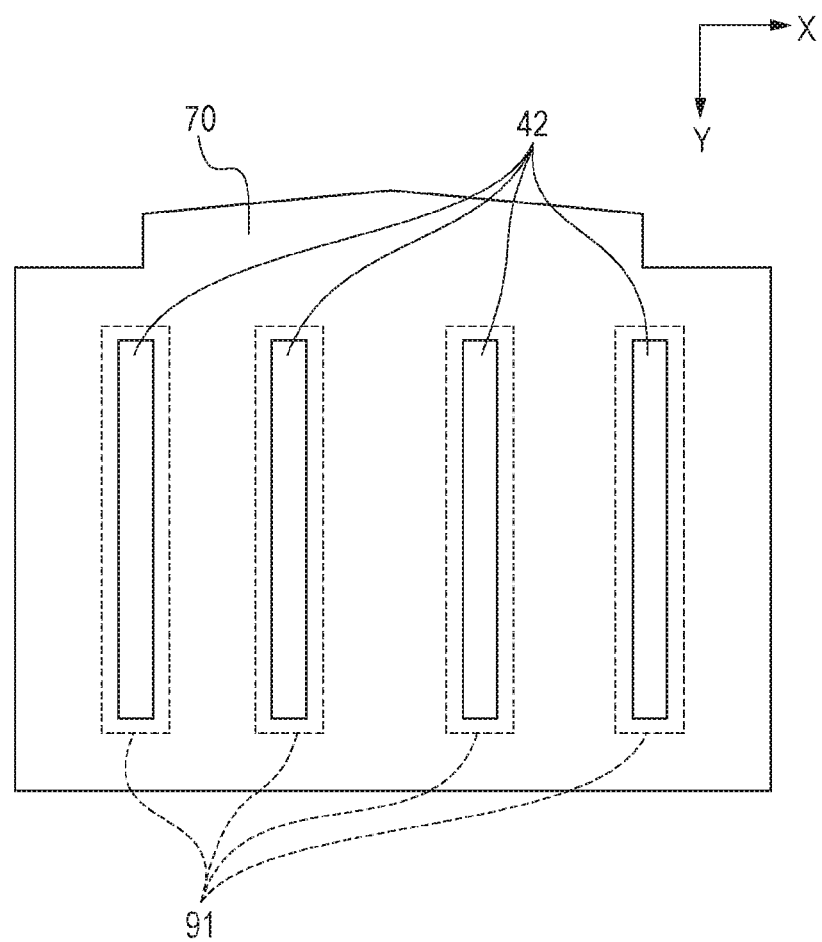
FIG. 3 is a schematic view illustrating the locations where elastic members according to the first embodiment are set.

Each glass pressing member 92 has a hole 921 (illustrated by a broken line). The glass pressing members 92 are set such that protrusions 93 of the cover member 70 engage with the holes 921, and are secured by pressing such that the glass members 90 do not fall off. More specifically, the protrusions 93 are inserted into the holes 921, and the glass pressing members 92 are moved in a longitudinal direction (−Y axis direction) to engage the protrusions 93 with the glass pressing members 92. Each glass pressing member 92 has a slit portion 922. Protrusions 94 of the cover member 70 that are provided for the slits are inserted into the slits 922, and the glass pressing members 92 are moved in the longitudinal direction (−Y axis direction) to engage the protrusions 94 that are provided for the slits with the glass pressing members 92. This secures the glass pressing members 92 by pressing without allowing the glass members 90 to fall off. Here, FIG. 3 is a schematic view of the cover member 70 according to the embodiment when seen from the top (+ side in the Z axis direction). Each elastic member 75 is disposed at a region 91, which is illustrated by a broken line in FIG. 3, so as to be formed continuously with an outer peripheral portion of the corresponding opening portion 42 that is provided in the cover member 70. Each elastic member 75 is formed in the shape of a continuous frame even at a location where the elastic member 75 contacts the corresponding glass member 90. Each elastic member 75 has a sufficient thickness that allows it to be elastically deformed so as to contact an uneven surface of the cover member 70 and an uneven surface of the corresponding glass member 90 without a gap. This allows each elastic member 75 to fill a portion between the cover member 70 and each glass member 90, so that it is possible to considerably improve dustproof performance. By the glass pressing members 92, the glass members 90 are pressed from thereabove against the cover member 70. That is, the glass members 90 are pressed in a −Z axis direction in FIG. 2 against the cover member 70 by the glass pressing members 92. Therefore, even if at least one of the cover member 70, the glass member 90, and the glass pressing member 92, for example, expands or contracts due to, for example, environmental changes, it is possible to achieve stable sealability (hermeticity).

[Function of Elastic Members 75]

Figure 4:
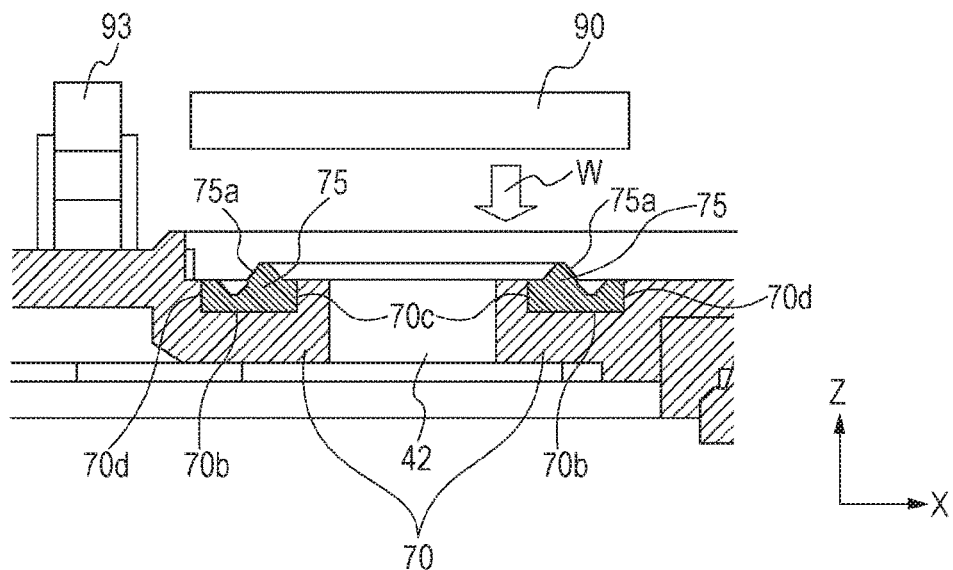
FIG. 4 is a schematic view illustrating a structure for improving dustproof performance according to the first embodiment.
Figure 4:
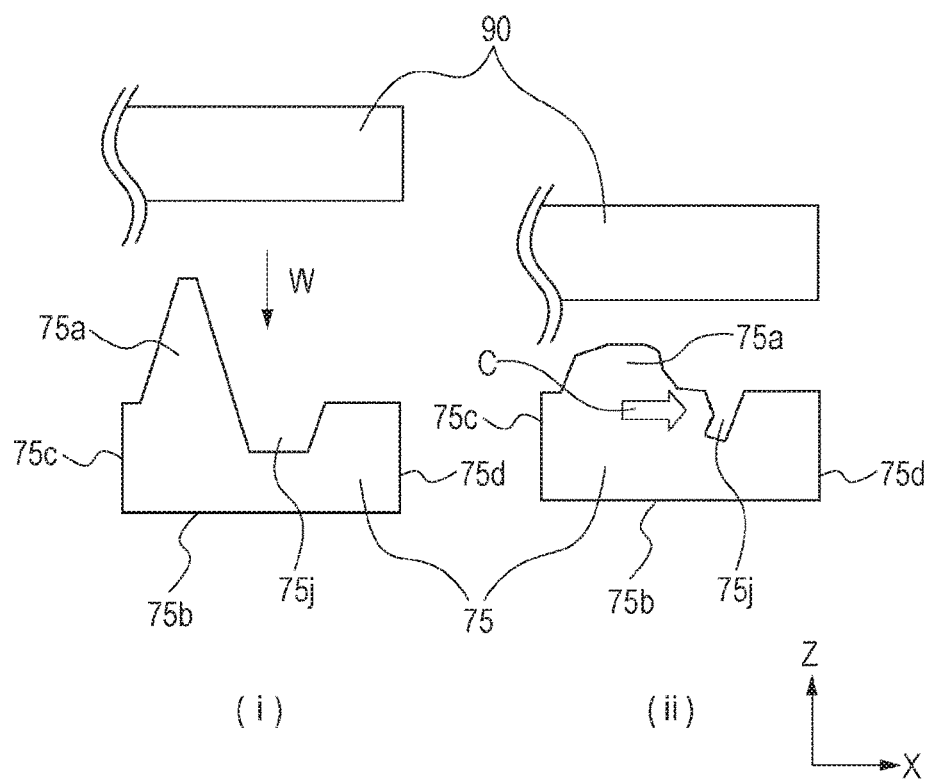

FIG. 4 is a sectional structural view illustrating a structure for improving dustproof performance according to the embodiment. FIG. 4(a) is a sectional view when the optical scanning apparatus 40 is cut away by a plane that is parallel to an XZ plane including the protrusions 93 in FIG. 2. More specifically, FIG. 4(a) illustrates, in a sectional view taken along line D-D (alternate long and short dashed line) in FIG. 2(a), a cross section of the leftmost opening portion 42 among the four opening portions 42 along the cross section. In a cross section taken along line E-E (alternate long and short dashed line) in FIG. 2(a), the length of each opening portion 42 in the Y-axis direction becomes long, but the structure near each elastic member 75 described below is similar to that in the sectional view taken along line D-D. FIG. 4(b) only illustrates the elastic member 75 and the glass member 90 shown in FIG. 4(a).

(Cover Member)

The cover member 70 has the opening portions 42 for allowing the light beams to exit from the inside of the optical scanning apparatus 40 to the outside. As illustrated in FIG. 3, the elastic members 75 are continuously disposed with the cover member 70 at the regions 91, which are illustrated by dotted lines, at outer peripheral portions of the opening portions 42. A cross section of the cover member 70 where an elastic member 75 is disposed has a C shape formed by surfaces 70b to 70d in FIG. 4(a), and the elastic member 75 is formed in a C-shaped recessed portion by the above-described method.

Each surface 70b that is parallel to an XY plane of the C-shaped recessed portion of the cover member 70 contacts a surface 75b of the corresponding elastic member 75 described below. Of the two surfaces 70c and 70d that are parallel to a YZ plane of the C-shaped recessed portion of the cover member 70, the surface 70c contacts a surface 75c of its corresponding elastic member 75, and the surface 70d contacts a surface 75d of its corresponding elastic member 75 described below. Each surface 70c is a surface that is closer to the opening portion 42 with reference to a protrusion 75a of the elastic member 75 described below, and each surface 70d is a surface that is farther away from the opening portion 42 with reference to the protrusion 75a of the elastic member 75 described below.

(Protrusions of Elastic Members)

The elastic members 75 each include the protrusion 75a that protrudes in the +Z axis direction. As illustrated in FIG. 4(b) (i), the shape of a cut surface of each protrusion 75a (hereunder simply referred to as the "sectional shape") formed by cutting each protrusion 75a by a plane that is parallel to the XZ plane is a trapezoidal shape. The sectional shape of the protrusion 75a of each elastic member 75 is such that its length in the X axis direction becomes smaller in the +Z axis direction. As shown in FIG. 4(a), an end of the protrusion 75a of each elastic member 75 is formed so as to contact a surface of the glass member 90 facing the cover member 70, the glass member 90 having moved in the direction of arrow W (−Z axis direction) from the top of FIG. 4(a). That is, when each glass member 90 is set on the cover member 70, the protrusion 75a of each elastic member 75 is a portion of the elastic member 75 that contacts this surface of the glass member 90 facing the cover member 70 first.

Accordingly, the contact portion of each elastic member 75 is a protruding portion, such as the protrusion 75a. By minimizing the area of contact with each glass member 90, it is possible to reduce the force that each glass member 90 receives from its corresponding elastic member 75 when each glass member 90 is set. By minimizing the area of contact between the protrusion 75a of each elastic member 75 and its corresponding glass member 90, it is possible to mitigate the problem in which light paths of the light beams are changed as a result of each glass member 90 being deformed by the force that it receives from its corresponding elastic member 75 when it is set. Here, a structure in which the elastic members 75 do not have the protrusions 75a will be described. In the structure in which the elastic members 75 do not have the protrusions 75a, the entire surface of each elastic member 75 that faces its corresponding glass member 90 contacts the corresponding glass member 90. Here, compared to the case in which the elastic members 75 each have the protrusion 75a according to the embodiment, each glass member 90 receives a large elastic force from its corresponding elastic member 75. In addition, the elastic force that is received from each elastic member 75 is not uniform along the longitudinal direction. As a result, the thickness of each glass member 90 along the longitudinal direction is no longer uniform, as a result of which each glass member 90 is deformed so as to be twisted. The deformation that has occurred in each glass member 90 changes the light paths of the light beams as described above.

By reducing the rigidity of the contact portion (the protrusion 75a) of each elastic member 75 with its corresponding glass member 90, that is, by forming the contact portions from elastic materials, it is possible to achieve good shape transferability with respect to the fine irregularities on the surface of each glass member 90. That is, since the protrusions 75a are formed from elastic materials, even if the surface of each glass member 90 that faces the cover member 70 is uneven, each protrusion 75a is deformed into a shape that is in correspondence with the unevenness. Therefore, the uneven surface of each glass member 90 can be filled with its corresponding elastic member 75. Consequently, when setting each glass member 90 on the opening portion 42 in the cover member 70, it is possible to improve the sealability (hermeticity) between each glass member 90 and the cover member 70.

Here, the area of contact of each elastic member 75 with its corresponding glass member 90 is smaller than the area of contact of each elastic member 75 with the cover member 70. The area of contact of each elastic member 75 with the cover member 70 is, as shown in FIG. 4(b), equal to the sum of the area of the surface 75b of the elastic member 75, which is a surface that is parallel to the XY plane, and the areas of the surfaces 75c and 75d of the elastic member 75, which are two surfaces that are parallel to the YZ plane. Here, each surface 75c is a surface that is closer to the opening portion 42 with reference to the protrusion 75a of the elastic member 75, and each surface 75d is a surface that is farther away from the opening portion 42 with reference to the protrusion 75a of the elastic member 75. On the other hand, the area of contact of each elastic member 75 with its corresponding glass member 90 is an area when the glass member 90 is pressed by its corresponding glass pressing member 92, that is, when the glass member 90 is set on the cover member 70. In the embodiment, such a structure is used to prevent any of the elastic members 75 bonded to the corresponding glass members 90 from being removed from the cover member 70 together with the corresponding glass members 90 when the glass members 90 are removed and replaced as a result of being scratched, etc.

(Grooves in Elastic Members)

Grooves 75j are provided beside the corresponding protrusions 75a of the elastic members 75. More specifically, the grooves 75j in the corresponding elastic members 75 are provided farther away from the corresponding opening portions 42 than the protrusions 75a of the corresponding elastic members 75 are. That is, the grooves 75j in the elastic members 75 are provided in regions situated outwardly of the protrusions 75a. In other words, when viewed from an upper surface of the cover member 70 (+ side in the Z axis direction), the grooves 75j are provided such that rectangular regions formed by the grooves 75j in the elastic members 75 are wider than rectangular regions formed by the protrusions 75a of the elastic members 75. By such a structure, as shown in FIG. 4(b) (ii), when the elastic members 75 are pressed by the glass members 90 when the glass members 90 are set, the protrusions 75a are squashed by the glass members 90, and are considerably deformed and moved in the direction of arrow C, that is, towards the grooves 75j. As a result of the deformation and movement of the protrusions 75a of the elastic members 75, the pressing force from the glass members 90 is absorbed by the elastic members 75. Therefore, the pressing force towards the cover member 70 is reduced, so that it is possible to considerably reduce the repulsive force of the cover member 70 with respect to the glass members 90. This makes it possible to, with dustproof performance being improved, further prevent, for example, deformation of the glass members 90 caused by the repulsive force.

As described above, the grooves 75j are provided farther away from the opening portions 42 than the protrusions 75a are. That is, the protrusions 75a are provided between the opening portions 42 and the corresponding grooves 75j. Therefore, if the protrusions 75a of the elastic members 75 are deformed when the glass members 90 are set on the cover member 70, the protrusions 75a can be set so as to move away from the opening portions 42. Each elastic member 75 is formed from a rubber material (that differs from that of the cover member 70), such as a hot melt material or an elastomer material. Such materials are viscous. When the elastic members 75 are exposed, dust or the like that floats in the air adheres to the elastic members 75. For example, when the grooves 75j in the elastic members 75 are provided closer to the opening portions 42 than the protrusions 75a are, the protrusions 75a are set so as to move towards the opening portions 42. In this case, the protrusions 75a of the elastic members 75 may protrude into the corresponding opening portions 42. When the protrusions 75a protrude into the corresponding opening portions 42, the elastic members 75 are exposed. When the grooves 75j are not formed in the elastic members 75, the direction of movement of the protrusions 75a can no longer be set. In such a case, the protrusions 75a of the elastic members 75 may move towards the opening portions 42, as a result of which the protrusions 75a may protrude into the opening portions 42 and become exposed.

However, as described above, in the embodiment, the protrusions 75a of the elastic members 75 are squashed towards the grooves 75j, that is, away from the opening portions 42, and are reliably interposed between the cover member 70 and the glass members 90. This makes it possible to also mitigate the problem in which light beams are blocked when, for example, dust adheres to any of the elastic members 75. Each groove 75j according to the embodiment has the functions of setting the direction of movement of its corresponding protrusion 75a when the protrusion 75a is deformed, reducing the area of contact between the elastic member 75 and its corresponding glass member 90, and reducing the elastic force from the elastic member 75.

In the embodiment, a synthetic-rubber based elastic member is used for each elastic member 75. In selecting the material of each elastic member 75, prevention of distortion of the device by an elastic force that is too strong, and maintenance of the reflectivity and transmissivity for sending a sufficient quantity of light to the surfaces to be scanned are important. Therefore, for, for example, a softening agent that is contained in each elastic member 75 serving as a sealing member, it is important to select a material that, while having low molecular weight, undergoes little outgassing and infrequently chemically attacks resin. Other types of elastic members, such as those formed from elastic materials that are urethane-based materials subjected to foam molding, and those formed from silicone-based elastic materials having excellent light resistance, may be used.

According to the embodiment, it is possible to improve sealability between the cover member and the transparent members of the optical scanning apparatus to improve dustproof performance.

Second Embodiment

[Shapes of Protrusions]

Figure 5:
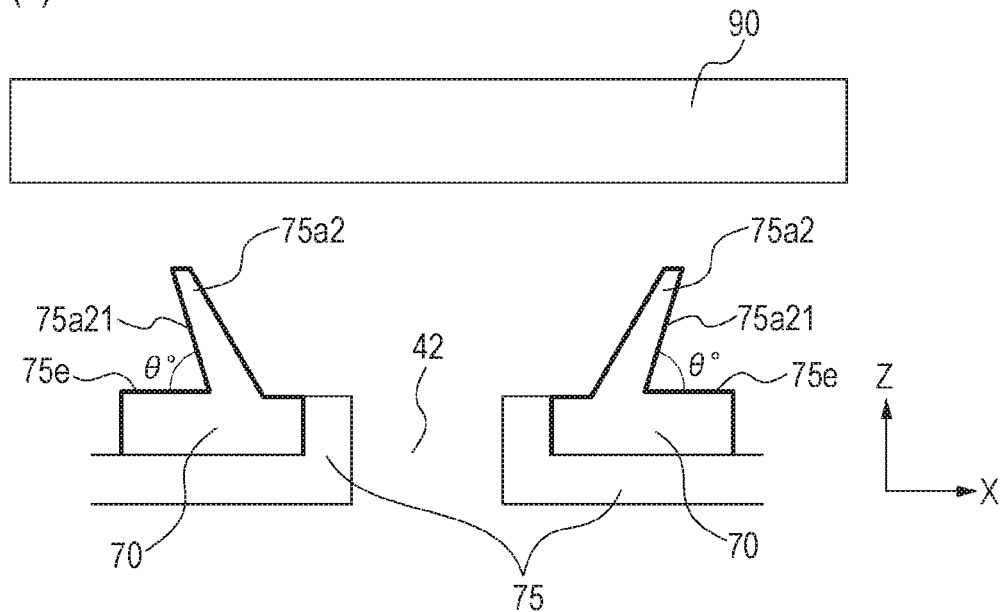
FIG. 5 is a schematic view illustrating an elastic member according to a second embodiment.
Figure 5:
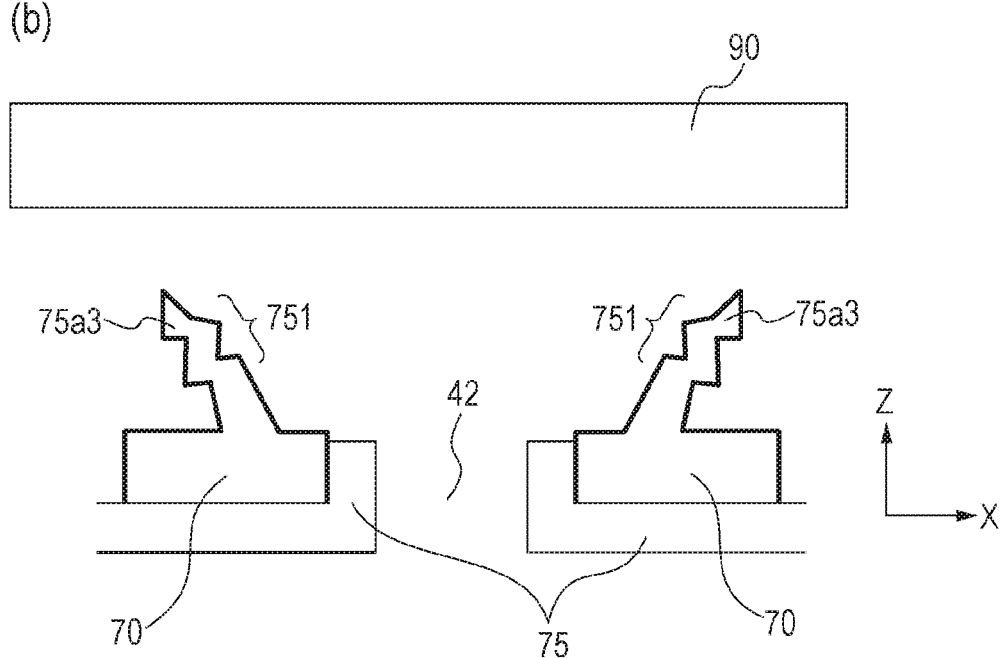

FIG. 5 is a schematic sectional view illustrating the shape of an elastic member 75 according to a second embodiment. Similarly to FIG. 4, FIG. 5 is a sectional view when an optical scanning apparatus is cut away by a plane that is parallel to the XZ plane including the protrusions 93 in FIG. 2. Each elastic member 75 has a protrusion 75a2 that extends towards the side where a glass member 90 is set. Each protrusion 75a2 according to the embodiment is formed so as to extend away from an opening portion 42 with decreasing distance from an end thereof (that is, in the +Z axis direction). As shown in FIG. 5(a), an angle θ between a surface 75a21 of each protrusion 75a2 that is far away from the opening portion 42 and a surface 75e of each elastic member 75 that faces the glass member 90 is an acute angle (θ<90°). In this way, by forming the protrusion 75a2 of each elastic member 75 so as to be inclined away from the opening portion 42, the protrusion 75a2 of each elastic member 75 falls in a direction away from the opening portion 42 and is pressed when the corresponding glass member 90 is set. That is, as also described in the first embodiment, even in this embodiment, it is possible to prevent the problem in which light beams are blocked when dust or the like adheres to any of the elastic members 75 as a result of the protrusion 75a2 of the corresponding elastic member 75 or the protrusions 75a2 of the corresponding elastic members moving towards the opening portion 42.

The protrusion 75a2 of each elastic member 75 is formed so as to be thin as shown in FIG. 5(a). That is, as shown in FIG. 5(a), the protrusion 75a2 of each elastic member 75 is formed such that the area of a cross section when the protrusion 75a2 is cut away by a plane that is parallel to the XZ plane is small. This makes it possible to also considerably reduce the elastic force that acts upon the glass member 90 from the protrusion 75a2.

(Bent Portions of Protrusions)

As shown in FIG. 5(b), a protrusion 75a3 that is formed by providing the protrusion 75a2 shown in FIG. 5(a) with a bent portion 751 may be provided. When each protrusion 75a3 is formed so as to have the bent portion 751, each protrusion 75a3 is easily bent. Therefore, it is possible to further reduce the elastic force that acts upon the glass members 90 from the protrusions 75a3.

As described in the first embodiment, a structure including grooves that are provided farther from the corresponding opening portions 42 than the protrusions 75a2 or the protrusions 75a3 are may be used.

Accordingly, according to the embodiments, it is possible to improve sealability between the cover member and the transparent members of the optical scanning apparatus to improve dustproof performance.

The present invention is not limited to the above-described embodiments, so that various changes and modifications can be made without departing from the spirit and scope of the present invention. Therefore, in order to make public the scope of the present invention, the following claims are attached.

REFERENCE SIGNS LIST 40 optical scanning apparatus
42 opening portion
70 cover member
75 elastic member
75a protrusion
85 housing
90 glass member

The invention claimed is:

1. An image forming apparatus comprising:
a photoconductor; and
an optical scanning apparatus configured to form an electrostatic latent image on the photoconductor, the optical scanning apparatus comprising:
an outer cover;
a light source configured to emit a light beam for forming the electrostatic latent image;
a rotary polygon mirror disposed inside the outer cover and configured to deflect the light beam emitted from the light source such that the photoconductor is scanned with the light beam;
an optical member disposed inside the outer cover and configured to guide the light beam deflected by the rotary polygon mirror to the photoconductor;
a transparent member attached to the outer cover; and
an elastic member molded on the outer cover;
wherein an opening, for passing the light beam deflected by the rotary polygon mirror from inside of the outer cover to outside of the outer cover, is formed on the outer cover and is covered by the transparent member,
wherein the elastic member is molded on the outer cover in such a way as to enclose the opening and protrude from a fluid passage, the elastic member being made of a material that is different from a material of the outer cover, the elastic member being more elastic than the outer cover, the fluid passage being formed on the outer cover in such a way as to enclose the opening, a molten material of the elastic member being poured into the fluid passage so as to mold the elastic member on the outer cover in such a way as to enclose the opening, and wherein the elastic member elastically deforms due to contact of a protruding portion of the elastic member protruding from the fluid passage with the transparent member, and the deformed elastic member seals a gap between the outer cover and the transparent member.

2. The image forming apparatus according to claim 1, wherein the protruding portion becomes thinner towards the transparent member.

3. The image forming apparatus according to claim 1, wherein the protrusion is inclined away from the opening portion.

4. The image forming apparatus according to claim 3, wherein the protrusion has a bent portion.

5. The image forming apparatus according to claim 1, wherein the elastic member has a groove that is positioned farther away from the opening portion than the protrusion is.

6. The image forming apparatus according to claim 1 further comprising a pressing member that presses the transparent member against the elastic member by engaging with the outer cover.

7. The image forming apparatus according to claim 1 further comprising:
   a developing unit configured to develop the electrostatic latent image formed by the optical scanning apparatus and forming a toner image; and
   a transferring unit configured to transfer the toner image formed by the developing unit to a recording medium.

\* \* \* \* \*